United States Patent
Masuda et al.

(10) Patent No.: US 10,761,070 B2
(45) Date of Patent: Sep. 1, 2020

(54) FLOW CONTROLLER AND GAS CHROMATOGRAPH APPARATUS USING THE SAME

(71) Applicant: Shimadzu Corporation, Kyoto (JP)

(72) Inventors: Shingo Masuda, Kyoto (JP); Kiyonori Koga, Kyoto (JP); Daiki Fukushima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 335 days.

(21) Appl. No.: 15/854,147

(22) Filed: Dec. 26, 2017

(65) Prior Publication Data
US 2019/0195839 A1  Jun. 27, 2019

(51) Int. Cl.
*G01N 30/32* (2006.01)
*G01N 30/02* (2006.01)

(52) U.S. Cl.
CPC ....... *G01N 30/32* (2013.01); *G01N 2030/025* (2013.01); *G01N 2030/328* (2013.01)

(58) Field of Classification Search
CPC ............. G01N 30/32; G01N 2030/328; G01N 2030/025; G01N 2030/324; G01F 1/42; G01F 1/363; G01F 1/36
USPC ............. 73/23.42, 1.16–1.36, 23.41, 861.42, 73/861.52, 861.61–861.64
See application file for complete search history.

(56) References Cited

U.S. PATENT DOCUMENTS

| | | | | |
|---|---|---|---|---|
| 5,351,520 A | * | 10/1994 | Buquet | B05B 7/1404 73/7 |
| 2006/0052904 A1 | * | 3/2006 | Brodeur | G01F 1/363 700/282 |
| 2011/0192600 A1 | * | 8/2011 | Patterson | G05D 7/0635 166/270 |

FOREIGN PATENT DOCUMENTS

| JP | H08-101176 A | 4/1996 |
|---|---|---|
| JP | H09-43220 A | 2/1997 |
| JP | H10-300737 A | 11/1998 |

OTHER PUBLICATIONS

Notification of Reasons for Refusal dated Nov. 13, 2018 in corresponding Japanese Application No. 2015-116674; 6 pages; Machine translation attached.

\* cited by examiner

*Primary Examiner* — Robert R Raevis
(74) *Attorney, Agent, or Firm* — Maier & Maier, PLLC

(57) ABSTRACT

A flow controller including a flow channel resistance disposed in a carrier gas supply flow channel, a control valve, pressure detecting portion 22 and a pressure difference detecting portion, a storage part storing a first calibration curve indicating a correlation between a pressure difference $\Delta p$ and a total flow volume $f_{temp1}$ at the first set supply pressure $P_{in, ref1}$ and a second calibration curve indicating a correlation between a pressure difference $\Delta p$ and the total flow volume $f_{temp2}$ at a second set supply pressure $P_{in, ref2}$ larger than the first set supply pressure $P_{in, ref1}$ is provided. A total flow volume f of the carrier gas is calculated based on the supply pressure $p_{in}$ detected by the pressure detecting portion, pressure difference $\Delta p$ information detected by the pressure difference detecting portion, the first calibration curve and the second calibration curve.

4 Claims, 3 Drawing Sheets

FLOW CONTROLLER AND GAS CHROMATOGRAPH APPARATUS USING THE SAME

TECHNICAL FIELD

The present invention relates to a flow controller configured to measure a total flow volume f of a carrier gas and a gas chromatograph apparatus using the same.

BACKGROUND

In a gas chromatograph apparatus, a liquid sample is injected into a sample vaporizing chamber, and the vaporized sample is carried on a carrier gas and is introduced into a column. At this time, a total flow volume f of the carrier gas to be supplied to a sample introducing part needs to be controlled precisely for accurate quantitative determination and quantitative determination in an analysis, and thus the total flow volume f of the carrier gas in a carrier gas supply flow channel is measured by using a pressure difference sensor and a pressure sensor (for example, see Patent Document 1).

FIG. 3 is a schematic configuration diagram illustrating an example of a gas chromatograph apparatus of the related art.

A gas chromatograph apparatus 101 includes a sample vaporizing chamber 10 in which a sample is injected and vaporized, a column 11, a detector 12, a carrier gas supply flow channel 20, a purge flow channel 30, a split flow channel 40, a control unit 150, and a flow controller 160.

A septum formed of silicon rubber (not illustrated) is fitted in an opening provided at a head portion of the sample vaporizing chamber 10. An outlet end of the carrier gas supply flow channel 20 for introducing the carrier gas, an inlet end of the purge flow channel 30 for discharging outside undesired components generated in the septum, an inlet end of the split flow channel 40 for discharging outside an excessive vaporized sample together with the carrier gas, and an inlet end of the column 11 are connected to an interior of the sample vaporizing chamber 10. At the time of the analysis using the sample vaporizing chamber 10 as described above, an analyst is capable of dropping a liquid sample into the interior of the sample vaporizing chamber 10 by picking a needle of a microsyringe 13 having a liquid sample stored therein into the septum. As the septum has a resiliency, a hole formed when the needle is inserted is closed immediately when the needle is removed.

The carrier gas supply flow channel 20 includes, from an upstream side, a cylinder 14 containing the carrier gas encapsulated therein, a laminar flow tube (flow channel resistance) 21 configured to cause an adequate pressure drop in the carrier gas, and a control proportional valve (control valve) 24 configured to be capable of adjusting an opening degree for adjusting the total flow volume f of the carrier gas disposed therein. Further provided are a pressure sensor (pressure detecting portion) 22 configured to detect a supply pressure $p_{in}$ on an upstream side of the laminar flow tube 21 and a pressure difference sensor (pressure difference detecting portion) 23 configured to detect a pressure difference $\Delta p$ between a supply pressure $p_{in}$ on the upstream side of the laminar flow tube 21 and a pressure on a downstream side thereof.

The purge flow channel 30 includes a pressure sensor 31 configured to detect an inlet port pressure $p_e$, an openable and closable purge valve 32, and a pressure sensor 33 configured to detect a purge pressure $p_p$, and the split flow channel 40 includes an openable and closable discharge valve 41 disposed thereon. Therefore, when the inlet port pressure $p_e$ in the sample vaporizing chamber 10 abruptly increases, the discharge valve 41 is opened to discharge a certain ratio of the carrier gas or the sample in the sample vaporizing chamber 10 to the outside via the split flow channel 40.

The control unit 150 is embodied by a personal computer and includes a CPU 151 and a memory (storage part) 152. Describing functions processed by the CPU 151 with reference to a block diagram in FIG. 3, the CPU 151 includes an acquiring part 51a configured to acquire a supply pressure $P_{in}$ from the pressure sensor 22 and a pressure difference $\Delta p$ from the pressure difference sensor 23 at predetermined time intervals, a measuring part 151b configured to measure the total flow volume f of the carrier gas in the carrier gas supply flow channel 20 at the predetermined time intervals, and a flow rate control part 151c configured to control the flow controller 160 based on the obtained total flow volume f and the like.

In the measurement by using the gas chromatograph apparatus 101 as described above, the carrier gas of the total predetermined flow volume f is supplied to the sample vaporizing chamber 10. When the liquid sample is dropped into the interior of the sample vaporizing chamber 10, the sample vaporized in the sample vaporizing chamber 10 is sent to the column 11 together with the carrier gas, and is separated into components in the column 11.

Subsequently, a measuring method for measuring the total flow volume f of the carrier gas by the measuring part 151b of the gas chromatograph apparatus 101 will be described. This measuring method includes a creating process (A') for creating a common calibration curve of the flow controller 160, a mounting process (B') for mounting the flow controller 160 to the gas chromatograph apparatus 101, and a calculating process (C') for calculating the total flow volume f based on the common calibration curve.

(A') Creating Process

Designers control the supply pressure $P_{in}$ to a set supply pressure $P_{in,ref}$ (for example, 600 kPa) by using the flow controller 160 at a predetermined atmospheric pressure $P'_{ref}$, and then measure a measured total flow volume $F_1$ when the pressure difference $\Delta p$ is set to a pressure difference $\Delta P_1$ by controlling the control proportional valve 24. Furthermore, the designers measure a measured total flow volume $F_2$ when the pressure difference $\Delta p$ is set to a pressure value $\Delta P_2$ by controlling the control proportional valve 24. In this manner, the designers measure respective measured total flow volumes $F_n$ at various pressure differences $\Delta P_N$ with the supply pressure $p_{in}$ being controlled to the set supply pressure $P_{in,\,ref}$ at the predetermined atmospheric pressure $P'_{ref}$. Then, the designers create the common calibration curve indicating a correlation between the pressure difference $\Delta p$ and a total flow volume $f_{temp}$.

(B') Mounting Process

The designers mount the flow controller 160 on the gas chromatograph apparatus 101, and store the common calibration curve in the memory 152. In other words, the common calibration curve is used for all the units irrespective of differences among units (gas chromatograph apparatus).

(C') Calculating Process

At the time of sample analysis performed by analysts, the measuring part 151b calculates a provisional total flow volume $f_{temp}$ by substituting the pressure difference $\Delta p$ detected by the pressure difference sensor 23 into the common calibration curve. Subsequently, the measuring part 151b obtains the total flow volume f by substituting the supply pressure $p_{in}$ detected by the pressure sensor 22, the provisional total flow volume $f_{temp}$, and the set supply pressure $P_{in,ref}$ into the following expression (4).

$$f = f_{temp} \times (p_{in}/P_{in,ref}) \quad (4)$$

PATENT LITERATURE

PTL1: JP-A-10-300737

SUMMARY OF INVENTION

However, the measuring method described above, using the expression (4) in the calculating process (C') as the common calibration curve is created in a state in which the common calibration curve is controlled to the set supply pressure $P_{in,ref}$ (for example, 600 kPa) in the creating process (A'), has a drawback that the accuracy of the calculated total flow volume f is lowered as the difference between the supply pressure $p_{in}$ and the set supply pressure $P_{in,ref}$ increases.

The measuring method described above, storing the common calibration curve created in the creating process (A') in the memory 152 in the mounting process (B'), has another drawback that the calculated total flow volume f may have an error when a value of resistance in the laminar flow tube 21 in the creating process (A') is different from a value of resistance in the laminar flow tube 21 in calculating process (C').

Accordingly, it is an object of the invention to provide a flow controller capable of measuring a total flow volume f of a carrier gas accurately and a gas chromatograph apparatus using the same.

In order to solve the above-described problems, a flow controller of the invention includes: a flow channel resistance disposed in a carrier gas supply flow channel; a control valve provided on a downstream side of the flow channel resistance and being capable of adjusting an opening degree; a pressure detecting portion configured to detect a supply pressure $p_{in}$ on an upstream side of the flow channel resistance; and a pressure difference detecting portion configured to detect a pressure difference $\Delta p$ between the supply pressure $p_{in}$ on the upstream side of the flow channel resistance and a pressure on the downstream side, the flow controller including: a storage part configured to store a first calibration curve indicating a correlation between a pressure difference $\Delta p$ and a total flow volume $f_{temp1}$ at the first set supply pressure $P_{in, ref1}$ and a second calibration curve indicating a correlation between a pressure difference $\Delta p$ and a total flow volume $f_{temp2}$ at a second set supply pressure $P_{in,ref2}$ larger than the first set supply pressure $P_{in,ref1}$, wherein the total flow volume f of the carrier gas is calculated based on the supply pressure $p_{in}$ detected by the pressure detecting portion, a pressure difference $\Delta p$ information detected by the pressure difference detecting portion, the first calibration curve, and the second calibration curve.

As used herein the term "first set supply pressure $P_{in, ref1}$" is intended to include a given numerical value predetermined by the designers, and preferably is a lower limit value of the supply pressure $p_{in}$ when the flow controller is used (specification).

Also, as used herein the term "second set supply pressure $P_{in,ref2}$" is intended to include a given numerical value predetermined by the designers, and preferably is an upper limit value of the supply pressure $p_{in}$ when the flow controller is used (specification).

Also, as used herein the term "pressure difference $\Delta p$ information" is intended to include the pressure difference $\Delta p$ and the like.

In the flow controller of the invention, the first calibration curve created at the first set supply pressure $P_{in, ref1}$ and the second calibration curve created at the second set supply pressure $P_{in,ref2}$ (two or more calibration curves) are stored. Therefore, when the flow controller is used, if the supply pressure $p_{in}$ detected by the pressure detecting portion is close to the first set supply pressure $P_{in, ref1}$, the total flow volume f is calculated by mainly using the first calibration curve, and if the supply pressure $p_{in}$ detected by the pressure detecting portion is close to the second set supply pressure $p_{in,ref2}$, the total flow volume f is calculated by mainly using the second calibration curve.

Advantageous Effects of Invention

As described thus far, according to the flow controller of the invention, as the first calibration curve of the "first set supply pressure $p_{in, ref1}$" and the second calibration curve of the "second set supply pressure $P_{in,ref2}$" having a small difference from the supply pressure $P_{in}$ detected by the pressure detecting portion are used, the total flow volume f of the carrier gas may be measured accurately.

Means for Solving Other Problem and Effects

The flow controller of the invention may be configured in such a manner that when the supply pressure $p_{in}$ detected by the pressure detecting portion is smaller than the first set supply pressure $P_{in, ref1}$, the total flow volume f of the carrier gas is calculated based on the following expression (1), and when the supply pressure $p_{in}$ is equal to or higher than the first set supply pressure $P_{in, ref1}$ and lower than the second set supply pressure $P_{in,ref2}$, the total flow volume f of the carrier gas is calculated based on the following expression (2), and when the supply pressure $p_{in}$ is equal to or higher than the second set supply pressure $P_{in,ref2}$, the total flow volume f of the carrier gas may be calculated based on the following expression (3).

$$f = f_{temp1} \times (p_{in}/P_{in,ref1}) \quad (1)$$

$$f = ((p_{in} - P_{in,ref1}) \times f_{temp2} - (P_{in,ref2} - p_{in}) \times f_{temp1})/(P_{in,ref2} - P_{in,ref1}) \quad (2)$$

$$f = ((p_{in} - P_{in,ref1}) \times f_{temp2} + (p_{in} - P_{in,ref2}) \times f_{temp1})/(P_{in,ref2} - P_{in,ref1}) \quad (3)$$

As described thus far, according to the flow controller of the invention, as the first calibration curve of the "first set supply pressure $p_{in, ref1}$" and the second calibration curve of the "second set supply pressure $P_{in,ref2}$" are used for internal division or external division, the total flow volume f of the carrier gas may be measured accurately.

The flow controller of the invention includes an atmospheric pressure detecting part configured to detect the atmospheric pressure P', the first calibration curve and the second calibration curve are created by the atmospheric pressure $P'_{ref}$, and the total flow volume f of the carrier gas may be corrected based on the atmospheric pressure P' detected by the atmospheric pressure detecting part and the atmospheric pressure $P'_{ref}$.

As described above, according to the flow controller of the invention, as the atmospheric pressure may be corrected by replacing with $(p - P'_{ref} + p')$ when the atmospheric pressure is p' during the usage of the flow controller, the influence of the change in atmospheric pressure may be reduced.

The flow controller of the invention may include the flow controller as described above; a sample introducing part configured to receive an injection of a sample and vaporize the sample; a carrier gas supply flow channel connected to the sample introducing part; a column connected to the sample introducing part; and a control unit configured to measure the total flow volume f of the carrier gas flowing through the carrier gas supply flow channel.

DETAILED DESCRIPTION

Figure 1:
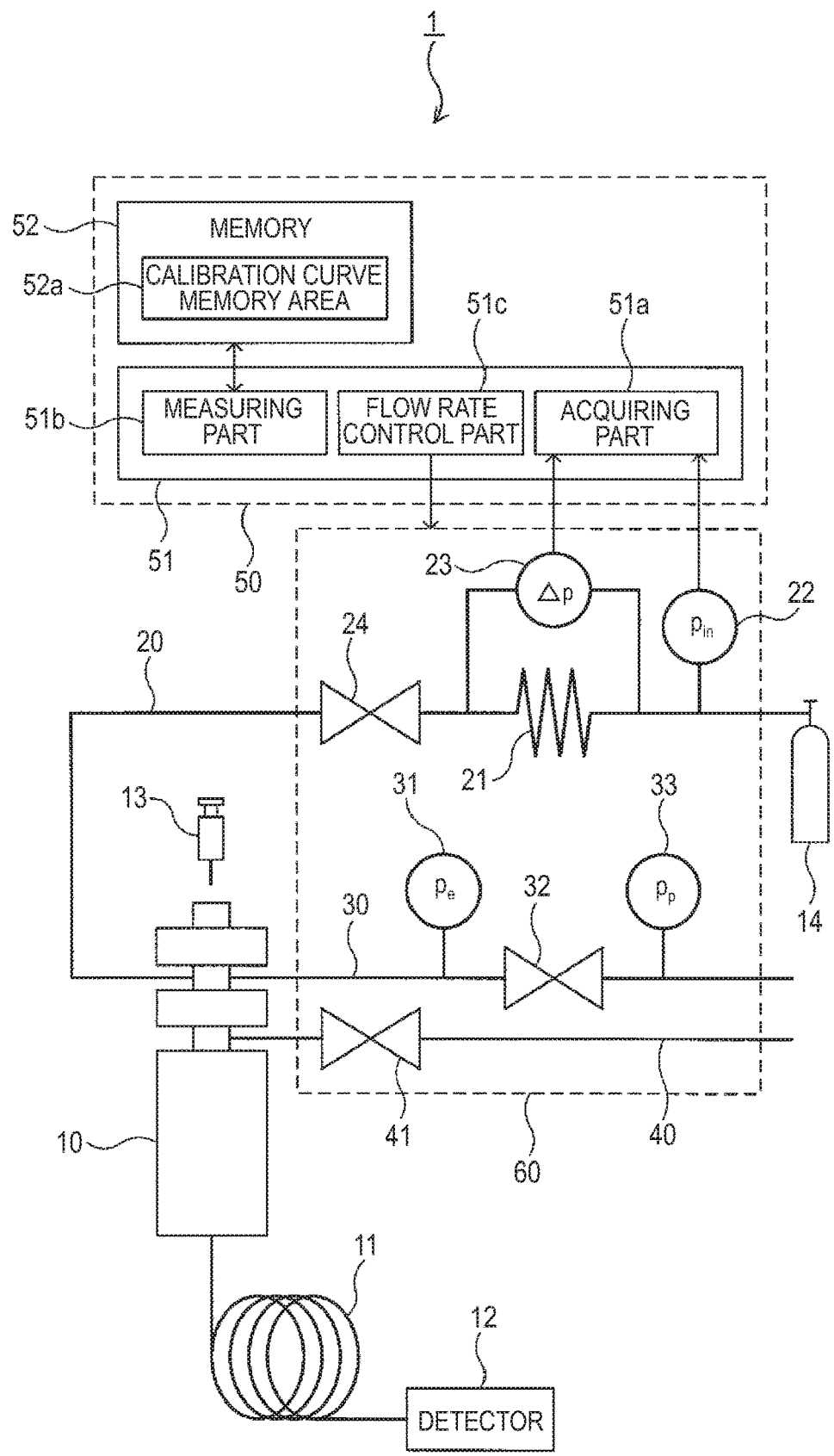
FIG. 1 is a schematic configuration diagram illustrating an example of a gas chromatograph apparatus according to the invention.

Referring now to the drawings, an embodiment of the present invention will be described. It is needless to say that the invention is not limited to an embodiment described below, and various modes are included without departing the gist of the invention.

FIG. 1 is a schematic configuration of an example of the gas chromatograph apparatus of the invention. Note that like parts as the gas chromatograph apparatus 101 are indicated by like reference numerals and description will be omitted.

A gas chromatograph apparatus 1 includes a sample vaporizing chamber 10 in which a sample is injected and vaporized, a column 11, a detector 12, a carrier gas supply flow channel 20, a purge flow channel 30, a split flow channel 40, a control unit 50, and a flow controller 60.

Figure 3:
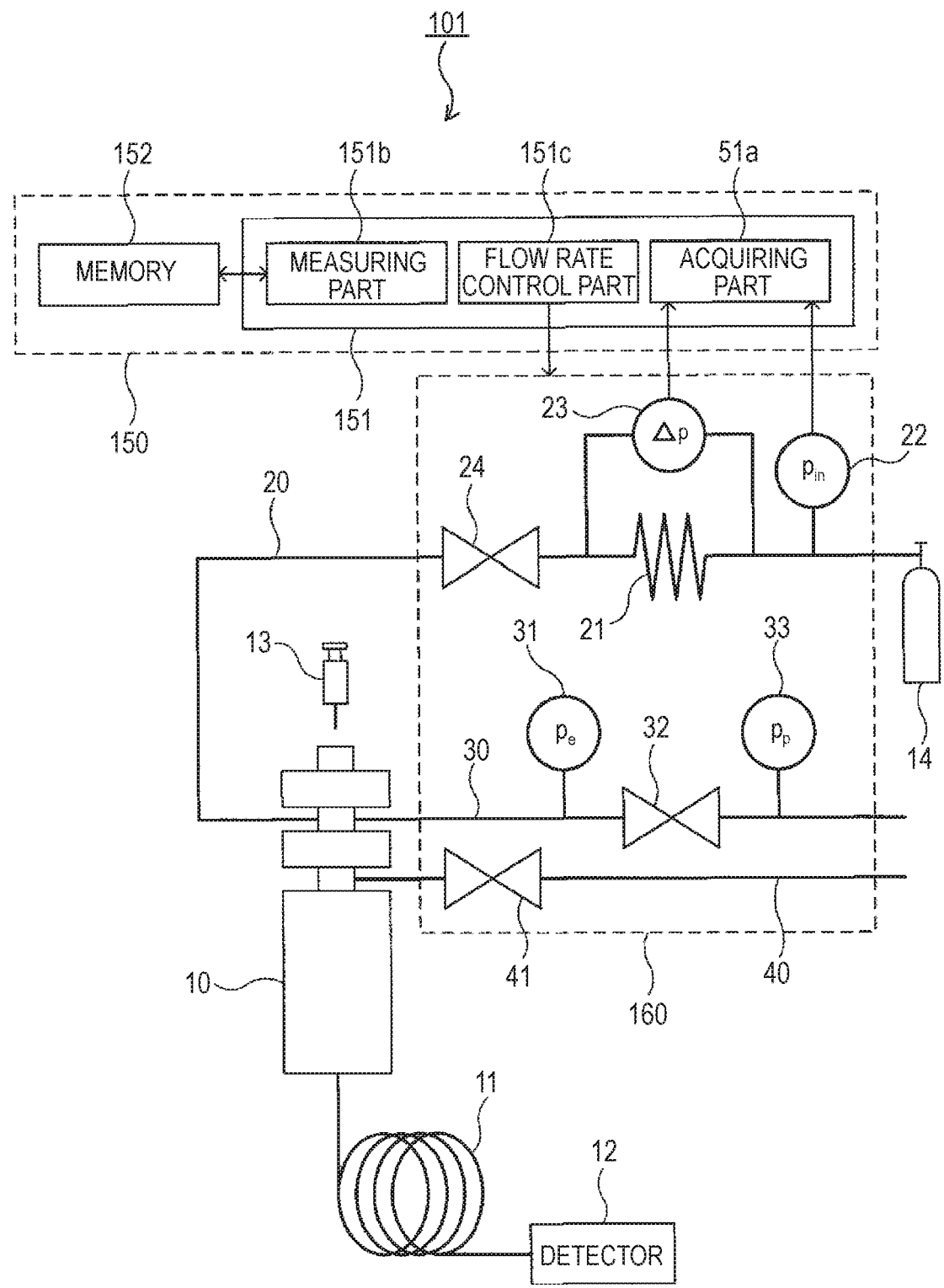
FIG. 3 is a schematic configuration drawing illustrating an example of a gas chromatograph apparatus of the related art.

The control unit 50 is embodied by a personal computer and includes a CPU 51 and a memory (storage part) 52. Describing functions processed by the CPU 51 with reference to a block diagram in FIG. 3, the CPU 51 includes an acquiring part 51a configured to acquire a supply pressure $p_{in}$ from a pressure sensor 22 and a pressure difference $\Delta p$ from a pressure difference sensor 23 at predetermined time intervals, a measuring part 51b configured to calculate a total flow volume f of a carrier gas in the carrier gas supply flow channel 20 at the predetermined time intervals, and a flow rate control part 51c configured to control the flow controller 60 based on the obtained total flow volume f.

Figure 2:
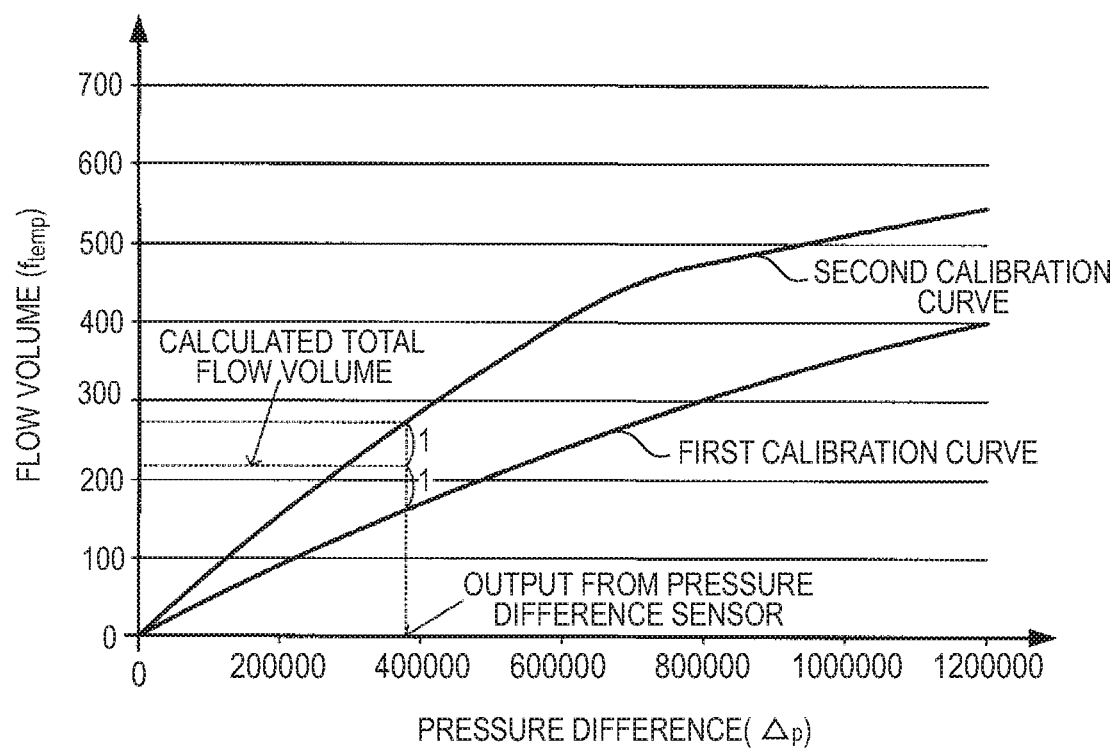
FIG. 2 is a drawing illustrating a first calibration curve and a second calibration curve.

In addition, the memory 52 includes a calibration curve memory area 52a configured to store a first calibration curve indicating a correlation between a pressure difference $\Delta p_n$ and a total flow volume $f_{temp1}$ at the first set supply pressure $P_{in,\,ref1}$ (for example, 400 kPa) and a second calibration curve indicating a correlation between a pressure difference $\Delta p_n$ and a total flow volume $f_{temp2}$ at a second set supply pressure $P_{in,ref2}$ (for example, 800 kPa). FIG. 2 is a drawing illustrating the first calibration curve and the second calibration curve obtained by the gas chromatograph apparatus 1.

The measuring part 51b performs control for calculating the total flow volume f of the carrier gas based on the supply pressure $p_{in}$ from the pressure sensor 22, the pressure difference $\Delta p$ from the pressure difference sensor 23, the first calibration curve, and the second calibration curve. Specifically, the measuring part 51b determines whether the supply pressure $p_{in}$ is either (a) lower than the first set supply pressure $P_{in,\,ref1}$, (b) equal to or higher than the first set supply pressure $P_{in,\,ref1}$ and smaller than the second set supply pressure $P_{in,\,ref1}$, or (c) equal to or higher than the second set supply pressure $P_{in,ref2}$.

When (a) lower than the first set supply pressure $P_{in,\,ref1}$ is true, the measuring part 51b calculates a provisional total flow volume $f_{temp1}$ by substituting the pressure difference $\Delta p$ detected by the pressure difference sensor 23 into the first calibration curve. Subsequently, the measuring part 51b obtains the total flow volume f by substituting the supply pressure $p_{in}$ detected by the pressure sensor 22, the provisional total flow volume $f_{temp1}$, and the first set supply pressure $P_{in,\,ref1}$ into the expression (1). In other words, the total flow volume f is obtained by using the first calibration curve.

When (b) equal to or higher than the first set supply pressure $P_{in,\,ref1}$, and smaller than the second set supply pressure $P_{in,ref2}$ is true, the measuring part 51b calculates the provisional total flow volume $f_{temp1}$ by substituting the pressure difference $\Delta p$ detected by the pressure difference sensor 23 into the first calibration curve, and calculates a provisional total flow volume $f_{temp2}$ by substituting the same into the second calibration curve. Subsequently, the measuring part 51b obtains the total flow volume f by substituting the supply pressure $p_{in}$ detected by the pressure sensor 22, the provisional total flow volume $f_{temp1}$, the provisional total flow volume $f_{temp2}$, the first set supply pressure $P_{in,ref1}$, and the second set supply pressure $P_{in,ref2}$ into the expression (2). In other words, the total flow volume f is obtained by dividing internally using the first calibration curve and the second calibration curve.

When (c) equal to or higher than the second set supply pressure $P_{in,ref2}$ is true, the measuring part 51b calculates the provisional total flow volume $f_{temp1}$ by substituting the pressure difference $\Delta p$ detected by the pressure difference sensor 23 into the first calibration curve, and calculates the provisional total flow volume $f_{temp2}$ by substituting the same into the second calibration curve. Subsequently, the measuring part 51b obtains the total flow volume f by substituting the supply pressure $p_{in}$ detected by the pressure sensor 22, the provisional total flow volume $f_{temp1}$, the provisional total flow volume $f_{temp2}$, the first set supply pressure $P_{in,ref1}$, and the second set supply pressure $P_{in,ref2}$ into the expression (3). In other words, the total flow volume f is obtained by dividing externally using the first calibration curve and the second calibration curve.

A measuring method for measuring the total flow volume f of the carrier gas by the measuring part 51b of the gas chromatograph apparatus 1 will be described now. This measuring method includes Mounting Process (A) for mounting the flow controller 60 to the gas chromatograph apparatus 1, a first calibration curve creating process (B1) for creating the first calibration curve, a second calibration curve creating process (B2) for creating the second calibration curve, and a calculation process (C) for calculating the total flow volume f based on the first calibration curve and the second calibration curve.

(A) Mounting Process

The designers mount the flow controller 60 on the gas chromatograph apparatus 1.

(B1) First Calibration Curve Creating Process

Designers and analysts control the supply pressure $p_{in}$ to a supply pressure $P_{in,ref1}$ (for example, 400 kPa) by using the gas chromatograph apparatus 1 at a predetermined atmospheric pressure $P'_{ref}$ and then measure a measured total flow volume $F_1$ when the pressure difference $\Delta p$ is set to the pressure difference $\Delta P_1$ by controlling the control proportional valve 24. Furthermore, the designers measure a measured total flow volume $F_2$ when the pressure difference $\Delta p$ is set to a pressure value $\Delta P_2$ by controlling the control proportional valve 24. In this manner, the designers measure respective measured total flow volumes $F_n$ set at various pressure differences $\Delta P_n$ with the supply pressure $p_{in}$ being controlled to the supply pressure $P_{in,\ ref1}$ at the predetermined atmospheric pressure $P'_{ref}$. Then, the designers create the first calibration curve indicating a correlation between the pressure difference $\Delta p$ and the total flow volume $f_{temp1}$.

(B2) Second Calibration Curve Creating Process

Designers and analysts control the supply pressure $p_{in}$ to a supply pressure $P_{in,ref2}$ (for example, 800 kPa) by using the gas chromatograph apparatus 1 at a predetermined atmospheric pressure $P'_{ref}$, and then measure a measured total flow volume $F_1$ when the pressure difference $\Delta p$ is set to the pressure difference $\Delta P_1$ by controlling the control proportional valve 24. Furthermore, the designers measure a measured total flow volume $F_2$ when the pressure difference $\Delta p$ is set to a pressure value $\Delta P_2$ by controlling the control proportional valve 24. In this manner, the designers measure respective measured total flow volumes $F_n$ set at various pressure differences $\Delta P_n$ with the supply pressure $p_{in}$ being controlled to the supply pressure $P_{in,ref2}$ at the predetermined atmospheric pressure $P'_{ref}$. Then, the designers create the second calibration curve indicating a correlation between the pressure difference $\Delta p$ and the total flow volume $f_{temp2}$.

(C) Calculating Process

At the time of sample analysis by the analysts, the measuring part 51*b* performs the control as described above.

As described thus far, according to the gas chromatograph apparatus 1 of the invention, by the first calibration curve of the "first set supply pressure $P_{in,\ ref1}$" and the second calibration curve of the "second set supply pressure $P_{in,ref2}$" being used for internal division or external division, the total flow volume f of the carrier gas may be measured accurately.

Other Embodiment

<1> The gas chromatograph apparatus 1 described above is configured to calculate the total flow volume f of the carrier gas by using the expressions (1) to (3). Instead, however, a configuration including the atmospheric pressure detecting part configured to detect the atmospheric pressure p', and correcting the total flow volume f of the carrier gas based on the atmospheric pressure p' detected by the atmospheric pressure detecting part and the atmospheric pressure $P'_{ref}$ is also applicable.

<2> The gas chromatograph apparatus 1 described above is configured to calculate the total flow volume f of the carrier gas by using the expressions (1) to (3). Instead, however, when the segments (a) to (c) include a segment in which the change in total flow volume f is not linear (a segment having an inflection point) by the supply pressure $p_{in}$, a configuration in which the total flow volume f is corrected by a quadric or higher correction formula (polynomial expression) having the supply pressure $p_{in}$ as a variable is also applicable.

<3> The gas chromatograph apparatus 1 described above is configured to create the first calibration curve by using the first calibration curve creating process (B1). Instead, however, a configuration in which the first calibration curve is created by using the first calibration curve creating process (B1') given below is also applicable. A configuration in which the second calibration curve is also created likewise is also applicable as a matter of course.

(B1') First Calibration Curve Creating Process

Designers and analysts control the supply pressure $p_{in}$ to a supply pressure $P_{in,ref}$ (for example, 400 kPa) by using the flow controller 60, and then measure a measured reference pressure difference $\Delta P_{ref1}$ when the total flow volume f is set to the reference total flow volume $F_{ref}$ by controlling the control proportional valve 24. Then, the following expression (5) is created by using the reference total flow volume $F_{ref}$ and the measured reference pressure difference $\Delta P_{ref1}$, and various pressure differences $\Delta p$ are substituted into the expression (5) to calculate the total flow volume $f_{temp1}$, so that the first calibration curve indicating the correlation between the pressure difference $\Delta p$ and the total flow volume $f_{temp1}$ is created.

$$f_{temp1} = F_{ref} \times (\Delta p / \Delta P_{ref1}) \quad (5)$$

When the first calibration curve is standardized as in the first calibration curve creating process (B1') described above, the influence on the second or higher order may not be reduced. However, the first calibration curve may be created only by measuring the measured reference pressure difference $\Delta P_{ref1}$ at the reference total flow volume $F_{ref}$.

The invention claimed is:

1. A flow controller including: a flow channel resistance disposed in a carrier gas supply flow channel;
   a control valve provided on a downstream side of the flow channel resistance and being capable of adjusting an opening degree;
   a pressure detecting portion configured to detect a supply pressure $p_{in}$ on an upstream side of the flow channel resistance; and
   a pressure difference detecting portion configured to detect a pressure difference $\Delta p$ between the supply pressure $p_{in}$ on the upstream side of the flow channel resistance and a pressure on the downstream side, the flow controller comprising:
   a storage part configured to store a first calibration curve indicating a correlation between a pressure difference $\Delta p$ and a total flow volume $f_{temp1}$ at a first set supply pressure $P_{in,\ ref1}$ and a second calibration curve indicating a correlation between a pressure difference $\Delta p$ and a total flow volume $f_{temp2}$ at a second set supply pressure $P_{in,ref2}$ larger than the first set supply pressure $P_{in,ref1}$, and
   a measuring part configured to calculate a total flow volume f of the carrier gas based on the supply pressure $p_{in}$ detected by the pressure detecting portion, pressure difference $\Delta p$ information detected by the pressure difference detecting portion, and at least one of the first calibration curve and the second calibration curve.

2. The flow controller according to claim 1, comprising an atmospheric pressure detecting part configured to detect an atmospheric pressure p', wherein
   the first calibration curve and the second calibration curve stored in the storage part are created at an atmospheric pressure $P'_{ref}$, and
   the measuring part is configured to correct the total flow volume f of the carrier gas based on the atmospheric pressure p' detected by the atmospheric pressure detecting part and the atmospheric pressure $P'_{ref}$.

3. A gas chromatograph apparatus comprising:
   the flow controller according to claim 1;
   a sample introducing part connected to the carrier gas flow supply channel and configured to receive an injection of a sample and vaporize the sample; and
   a column connected to the sample introducing part; wherein
   the measuring part is also configured to measure the total flow volume f of the carrier gas flowing through the carrier gas supply flow channel.

4. The flow controller according to claim 1, wherein the measuring part is configured to calculate the total flow volume f of the carrier gas:

based on the expression $f=f_{temp1}\times(p_{in}/P_{in,ref1})$ if the supply pressure $p_{in}$ detected by the pressure detecting portion is smaller than the first set supply pressure $P_{in,ref1}$;

based on the expression $f=((p_{in}-P_{in,ref1})\times f_{temp2}-(P_{in,ref2}-p_{in})\times f_{temp1})/(p_{in,ref2}-P_{in,ref1})$ if the supply pressure $p_{in}$ is equal to or higher than the first set supply pressure $P_{in,ref1}$ and lower than the second set supply pressure $P_{in,ref2}$; and based on the expression $f=((p_{in}-P_{in,ref1})\times f_{temp2}+(p_{in}-P_{in,ref2})\times f_{temp1})/(p_{in,ref2}-P_{in,ref1})$ if the supply pressure $p_{in}$ is equal to or higher than the second set supply pressure $P_{in,ref2}$.

* * * * *